(12) United States Patent
Van Gestel et al.

(10) Patent No.: US 7,792,413 B2
(45) Date of Patent: *Sep. 7, 2010

(54) RECORDING AND REPRODUCING AN MPEG INFORMATION SIGNAL ON/FROM A RECORD CARRIER

(75) Inventors: Wilhelmus J. Van Gestel, Eindhoven (NL); Ronald W. J. J. Saeijs, Eindhoven (NL); Imran A. Shah, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 1963 days.

This patent is subject to a terminal disclaimer.

(21) Appl. No.: 10/784,533

(22) Filed: Feb. 23, 2004

(65) Prior Publication Data
US 2005/0031301 A1 Feb. 10, 2005

Related U.S. Application Data

(60) Division of application No. 10/227,203, filed on Aug. 23, 2002, now Pat. No. 6,724,978, which is a continuation of application No. 09/107,190, filed on Jun. 29, 1998, now Pat. No. 6,490,406, which is a continuation of application No. 08/709,502, filed on Sep. 6, 1996, now abandoned, which is a division of application No. 08/225,193, filed on Apr. 8, 1994, now Pat. No. 5,579,183.

(51) Int. Cl.
*H04N 5/91* (2006.01)

(52) U.S. Cl. ....................................................... 386/68

(58) Field of Classification Search ................... 386/68, 386/81, 95, 111, 124
See application file for complete search history.

(56) References Cited

U.S. PATENT DOCUMENTS

| 5,142,421 A | 8/1992 | Kahlman et al. ............... 360/40 |
| 5,245,483 A | 9/1993 | Van Gestel ..................... 360/40 |
| 5,289,276 A | 2/1994 | Siracusa et al. ............. 348/467 |
| 5,377,051 A * | 12/1994 | Lane et al. ..................... 386/81 |
| 5,396,374 A | 3/1995 | Kubota et al. .................. 360/27 |
| 5,400,187 A | 3/1995 | Van Gestel et al. ............. 360/48 |
| 5,424,878 A | 6/1995 | Rijckaert .................... 360/19.1 |
| 5,504,585 A | 4/1996 | Fujinami et al. ............. 358/335 |
| 5,537,215 A | 7/1996 | Niimura et al. .............. 358/335 |
| 5,566,174 A | 10/1996 | Sato et al. ....................... 370/84 |
| 5,579,183 A * | 11/1996 | Van Gestel et al. ............. 360/48 |
| 5,583,650 A * | 12/1996 | Lane et al. ..................... 386/81 |
| 5,602,956 A | 2/1997 | Suzuki et al. .................. 386/68 |
| 5,859,949 A | 1/1999 | Yanagihara ................... 386/68 |

* cited by examiner

*Primary Examiner*—Thai Tran
*Assistant Examiner*—Tat Chio

(57) ABSTRACT

During recording of an MPEG information signal on a record carrier, transport packets ($P_k$) are stored in signal blocks in a track on the record carrier. x transport packets of the MPEG information signal are stored in the second block sections (SB) of y signal blocks, where x and y are integers, $x \geq 1$ and $y > 1$, more specifically, $y > x$. Further, third block sections (TB) are present in one or more of the second block sections in the y signal blocks of a group for storing additional information, this additional information relating to the specific application of recording and reproducing the MPEG information signal on/from the record carrier.

17 Claims, 10 Drawing Sheets

FIG. 8c: | $P_{k-4}$ | DUMMY | DUMMY | $P_{k-1}$ | $P_k$ | DUMMY | $P_{k+2}$ | DUMMY | $P_{k+4}$ |

RECORDING AND REPRODUCING AN MPEG INFORMATION SIGNAL ON/FROM A RECORD CARRIER

CROSS-REFERENCE TO RELATED APPLICATIONS

This is a divisional application of U.S. patent application Ser. No. 10/227,203, filed Aug. 23, 2002 now U.S. Pat. No. 6,724,978, which is a continuation application of U.S. patent application Ser. No. 09/107,190, filed Jun. 29, 1998 (now U.S. Pat. No. 6,490,406), which is a continuation application of U.S. patent application Ser. No. 08/709,502, filed Sep. 6, 1996 (now abandoned), which was a divisional application of U.S. patent application Ser. No. 08/225,193, filed Apr. 8, 1994, now U.S. Pat. No. 5,579,183.

BACKGROUND OF THE INVENTION

1. Field of the Invention

The invention relates to the field of digital video tape recording and reproducing.

2. Description of the Related Art

The invention relates to a recording arrangement for recording an information signal in tracks on a record carrier, the recording arrangement including an input terminal for receiving the information signal and channel encoding apparatus for channel encoding the information signal to form a channel signal suitable for recording in a track on the record carrier. The recording arrangement also includes writing apparatus for writing the channel signal in the track. The channel signal includes multiple signal blocks which each include a first block section having a synchronization signal and a second block section which comprises a multitude of channel bytes. The invention also relates to a record carrier obtained with the recording arrangement, and to a reproducing arrangement for reproducing the video signal from the record carrier.

A recording arrangement as given in the opening paragraph is known from European Patent Application No. EP-A 492,704, corresponding to U.S. Pat. No. 5,245,483, reference (1).

The known recording arrangement is of the helical scan type and records an information signal, comprising a digital audio signal and a digital video signal, in audio signal recording sectors and video signal recording sectors, respectively, in multiple tracks. When recording a track, the video signal recording sector comes first and is followed by the audio signal recording sector. The order in which the sectors occur in a track can, however, also be in the reverse order. Furthermore, other sectors may be included in a track, such as, a clock run-in area, located at the beginning of a track, so as to enable a locking-in of the internal system clock on the signals read from the track, and preamble and postamble areas that are located between the various sectors and function as an edit gap. Reference is made in this respect to the earlier filed European Patent Application No. 93202950, corresponding to U.S. Pat. No. 5,424,878, reference (2) and European Patent Application No. 93201263, corresponding to U.S. Pat. No. 5,400,187, reference (3).

Reference is also made to: "Grand Alliance HDTV Specification", draft document, Feb. 22, 1994, reference (4); and to U.S. Pat. No. 5,142,421, reference (5).

These documents relate to proposals for a new digital video cassette (DVC) recorder standard, which enables the recording and reproduction of digital video and digital audio signals on/from a longitudinal magnetic record carrier. This new digital video recorder standard will lead to new digital video recorders and reproducers of the so-called DVC type. The above citations are hereby incorporated in whole by reference.

SUMMARY OF THE INVENTION

It is a object of the invention to provide a recording arrangement which is capable of recording other type of information signals in the known tape format as defined in the preamble. In the recording arrangement in accordance with a specific embodiment of the invention, the information signal is an MPEG information signal in accordance with an MPEG format, the MPEG information signal comprising multiple transport packets. Each time information is included in x transport packets of the MPEG information signal, the channel encoding apparatus stores the information included in the x transport packets of the MPEG information signal, into the second block sections of a group of y signal blocks of the channel signal. The second block section of at least the first signal block of the group of y signal blocks includes a third block section for storing identification information identifying the signal block as being the first signal block of the group of y signal blocks. Finally, x and y are integers such that $x \geq 1$ and $y > 1$.

In a specific embodiment, the information signal is an MPEG information signal in accordance with an MPEG format, the MPEG information signal comprising multiple sequential transport packets. The channel encoding apparatus stores information included in x transport packets of the MPEG information signal into the second block sections of a group of y signal blocks of the channel signal. The second block sections of the signal blocks include a third block section for storing sequence number information relating to a sequence number of the signal blocks. Finally, x and y are integers such that $x \geq 1$ and $y > 1$.

The invention is based on the following recognition. The draft Grand Alliance HDTV System Specification, dated Feb. 22, 1994, reference (4) above, more specifically, the chapters V and VI of this specification, includes a description of a transport system for transmitting an MPEG information signal. This signal includes a data compressed digital video signal and a corresponding data compressed digital audio signal, for broadcasting purposes or for transmission via a cable network. The MPEG information signal is in the form of transport packets having either an equal length or a variable length in time. In both cases, however, a transport packet comprises 188 bytes of information, the first byte being a synchronization byte.

A transmission of such an MPEG information signal, in the form of a recording on or a reproduction from a record carrier, such as a magnetic record carrier, requires that special measures be taken in order to accomplish such a transmission via the known tape format. More specifically, the invention relates to storing the transport packets in the signal blocks of the known tape format.

Generally, it can be said that, when storing the information included in a number of x transport packets of the MPEG information signal into a number of y signal blocks, some unoccupied space remains available in the y signal blocks which can be used for the storage of additional information. The additional information stored according to the invention, relates to the specific application of recording and reproducing the MPEG information signal on/from the record carrier. In a specific example of the DVC format, the second block sections may include 77 bytes of information. In that situation, two transport packets, from each of which the sync byte has been deleted, can be stored in second block sections of five signal blocks. Now, 11 bytes (=5×77-2×187) remain available in the five signal blocks. These 11 bytes may be divided over the second block sections of the five signal blocks in various ways so as to obtain the third block sections. An example of one such way is that the first two bytes of all second block sections are made available as third block sections, and that the last of the 11 available bytes can be considered as a third block section for indicating the boundary between the information of the two transport packets as stored in the five signal blocks.

In the above example, identification information, identifying the signal block as being the first signal block of the group of y signal blocks, can be stored in a third block section of the first signal block in a group of y signal blocks. Alternatively, sequence number information (sequence numbers) relating to the sequence of the signal blocks may be stored in the third block sections. This sequence number may also be identified as a continuity counter. The measures proposed result in a number of advantages.

The advantage of storing identification information to identify a signal block as being the first signal block in a group of y signal blocks, is that the beginning of a group can be detected, which simplifies the read out of the data during reproduction.

One advantage of storing sequence numbers is that, when reproducing the signal blocks, it can be decided, upon retrieval of the sequence numbers, whether a signal block has been missed because of reproduction errors, so that an error correction or concealment can be carried out. Another advantage of storing sequence numbers is that one may shuffle the information to be stored into the signal blocks upon recording. Upon retrieval of the sequence numbers, it is possible to perform a corresponding de-shuffling in response to the sequence numbers retrieved so as to obtain the original datastream.

Furthermore, having sequence numbers included in the third block sections of the signal blocks, makes it possible to repeat signal blocks, in case a transport packet of the MPEG data stream stored into those signal blocks requires higher protection against errors that can occur during the recording and a subsequent reproduction process.

In another specific embodiment, as before, the information signal is an MPEG information signal in accordance with an MPEG format, the MPEG information signal including multiple transport packets. The channel encoding apparatus stores the information included in x transport packets of the MPEG information signal, in the second block sections of a first group of y first signal blocks of the signal blocks of the channel signal, so as to enable a normal play mode using video information stored in the first group of y first signal blocks during a normal play reproduction mode. In addition, the channel encoding apparatus also retrieves a trick mode video signal from the MPEG information signal, and stores the trick mode video signal into second block sections of a second group of z second signal blocks of the signal blocks of the channel signal, so as to enable a trick play mode using the video information stored in the second signal blocks. Also, the second block sections of at least one signal block, in each first and second group of first and second signal blocks, respectively, include a third block section for storing identification information indicating whether the group contains first signal blocks or second signal blocks. Finally, x, y and z are integers such that $x \geq 1$, $y > 1$ and $z > 1$.

In a more specific embodiment, the information signal is an MPEG information signal in accordance with an MPEG format, the MPEG information signal including multiple transport packets. The channel encoding apparatus stores information included in x transport packets of the MPEG information signal into the second block sections of a group of y signal blocks of the channel signal. The second block sections of at least these signal blocks, in a group of y signal blocks that include the start of a transport packet, include a third block section for storing sequence number information relating to a transport packet sequence number corresponding to the transport packet having its start stored into the second block section of the signal block.

This enables both reproduction in a normal play mode using the first signal blocks, and reproduction in a trick play mode using the second signal blocks, in response to the detection of the information indicating the groups contain first signal blocks or second signal blocks, respectively.

In another specific embodiment, the second block sections of all signal blocks in each first and second group of first and second signal blocks, respectively, include a third block section for storing identification information indicating whether the group contains first signal blocks or second signal blocks.

In a more specific embodiment, the second block sections of a group of y signal blocks, each include a third block section for storing sequence number information relating to a transport packet sequence number corresponding to the transport packet for which information is stored in the signal block.

Storing a packet sequence number has advantages if an MPEG datastream is received having a constant bit-rate, and including a number of different video programs interleaved in the MPEG datastream. Generally, such a datastream has too high a bit-rate for recording the total datastream on the record carrier. The recording arrangement may include a program selector for retrieving one video program and the corresponding audio signal from the MPEG datastream, so as to obtain the MPEG information signal for recording. As information corresponding to only one video program, is included in a MPEG transport packet, such a program selector selects only those transport packets from the MPEG datastream that include information corresponding to the only video program. This means that some packets of the original MPEG datastream that were received are deleted. Upon reproduction, however, an MPEG video signal in accordance with the MPEG standard, however, now including only the one video program, should be regenerated. Such a regenerated datastream should have the transport packets that were selected during recording, at the same location, that is, in some way, dummy packets, corresponding to the packets deleted upon recording, must be inserted in the regenerated datastream. Upon recording, a sequence number is added to each transport packet that was received, i.e., also for the packets that will be deleted. The sequence numbers of the packets that are selected and stored, are stored in the third block section of the signal blocks in which the transport packets are stored. Upon reproduction, a sequence of numbers is retrieved, where each subsequent number retrieved will not necessarily be the next higher number. In that situation, one or more dummy packets must be inserted so as to regenerate the replica of the original MPEG datastream.

In another specific embodiment, the recording arrangement includes detection apparatus for detecting the moment of receipt of the transport packets and for generating timing information for each transport packet received. The timing information for a transport packet corresponds to the moment of receipt of the transport packet. The second block sections of at least those signal blocks in a group of y signal blocks that include the start of a transport packet, include a third block section for storing the timing information for the transport packet having its start stored in the second block section of the signal block.

In a more specific embodiment, the second block sections of a group of y signal blocks each include a third block section for storing the timing information corresponding to the transport packet which has information stored in the second block section of the signal block. Storing timing information corresponding to a transport packet, requires that the recording arrangement is provided with detection apparatus for detecting the time of receipt of a transport packet. This measure has advantages if an MPEG datastream is received having a variable bit-rate and including a number of different video programs interleaved in the MPEG datastream. As has been said above, generally, such datastream has too high a bit-rate for recording the total datastream on the record carrier. The recording arrangement includes a program selector for retrieving one video program with its corresponding audio signal from the MPEG datastream, so as to obtain the MPEG information signal for recording. As information corresponding to only one video program is included in a MPEG transport packet, such a program selector selects only those transport packets from the MPEG datastream that include information corresponding to the only one video program. By detecting and storing the timing information corresponding to a transport packet, the reproducing arrangement is capable of retrieving the timing information and recreating the MPEG information signal using the timing information.

It should be noted, that the measures (embodiments) discussed above can be applied solely or in combination with one another in the recording arrangement. As a result, record carriers will be produced having signal blocks stored in tracks on the record carrier. The signal blocks have a first block section which includes a synchronization signal and a second block section which includes a multitude of channel bytes. The x transport packets of the MPEG information signal are stored in the second block sections of a group of y signal blocks of the channel signal. Further, in accordance with the invention:

- the second block section of at least the first signal block of the group of y signal blocks includes a third block section for storing identification information identifying the signal block as being the first signal block of the group of y signal blocks; or
- the identification information is sequence number information and the second block sections of a group of y signal blocks all include a third block section for storing sequence number information relating to the sequence numbers of the signal blocks; or
- the second block sections of the signal blocks each include a third block section for storing identification information indicating whether the signal block includes 'normal play' data or 'trick mode' data; or
- the second block sections of at least those signal blocks in a group of y signal blocks that include the start of a transport packet also include a third block section for storing identification information relating to a transport packet sequence number corresponding to the transport packet having its start portion stored in the second block section of the signal block; or
- the second block sections of at least those signal blocks in a group of y signal blocks that include the start of a transport packet, also include a third block section for storing the timing information for the transport packet having its start in the second block section of the signal block; or
- the third block sections include information resulting from a combination of one or more of the measures listed above.

It will be apparent that a reproducing arrangement will be needed which is adapted to each specific embodiment of the recording arrangement, so as to enable a reproduction of the MPEG information signal recorded on the record carrier. Such a reproducing arrangement is the subject of the claims directed to the reproducing arrangement.

BRIEF DESCRIPTION OF THE DRAWINGS

These and other aspects of the invention will be apparent to those skilled in the art from and elucidated with reference to the embodiments described hereafter. In the drawings:

FIG. 8a illustrates an example of an original serial MPEG datastream having a constant bit-rate and packet rate, FIG. 8b shows the MPEG datastream that is recorded according to the invention, and FIG. 8c shows the regenerated replica of the original serial MPEG datastream according to the invention;

FIG. 13a illustrates an example of an original serial MPEG datastream having a variable bit-rate and packet rate, FIG. 13b shows the MPEG datastream that is recorded according to the invention, and FIG. 13c shows the regenerated replica of the original serial MPEG datastream, according to the invention;

DESCRIPTION OF THE PREFERRED EMBODIMENTS

Figure 1:
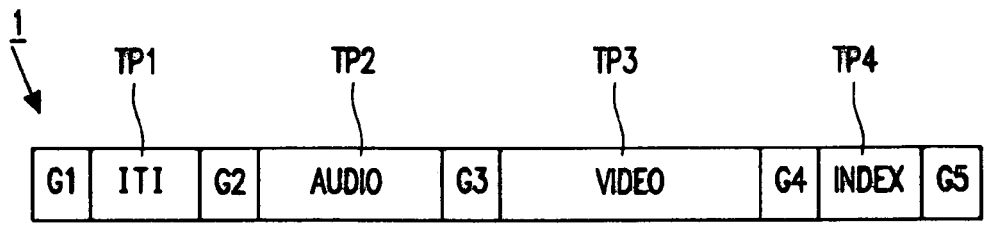
FIG. 1 shows the track format of a record carrier of the DVC-type.

FIG. 1 shows the format of the signals as they are recorded in a track on a magnetic record carrier by a helical scan video recorder of the DVC type. The left end of the track 1 in FIG. 1 is the start of the track, and the right end of the track is the terminal part of the track. The track includes a number of track parts. The track part denoted by G1 is the pre-amble track part. An example of the preamble track part G1 has been described extensively in reference (1) above.

The track part G1 is followed by tracking tone recording part TP1, which is denoted by ITI (insert timing information) track part and which contains a tracking tone, synchronization information and identification (or timing) information. Further explanation of the contents of the ITI track can be found in reference (3) above.

The track part TP1 is followed by an edit gap G2. The edit gap G2 is followed by the track part TP2, which is the audio signal recording sector and includes digital audio information. The edit gap G3 is followed by a track part TP3 which is the video signal recording sector and includes digital video information. The edit gap G4 is followed by a track part TP4, denoted by INDEX and which includes subcode information, such as, absolute and/or relative time information and a table of contents (TOC). The track is terminated by the track part G5. It should be noted that the sequence order in which the parts TP1, TP2 and TP3 occur in the tracks may be different.

Figure 2:
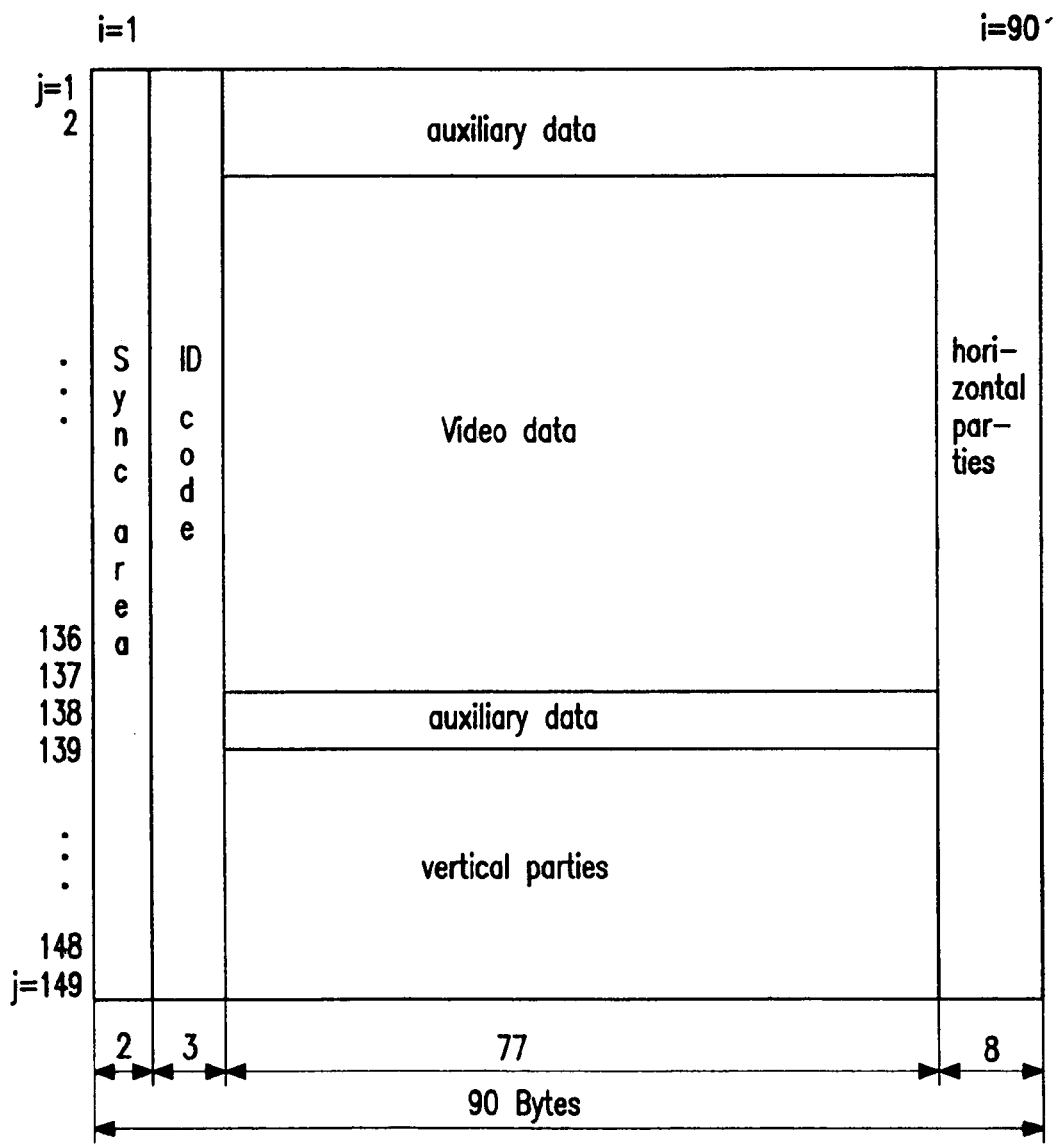
FIG. 2 schematically illustrates the contents of the video signal recording sector in the track of FIG. 1.

The contents of the video signal recording sector TP3 is given in FIG. 2. FIG. 2 shows, schematically, 149 horizontal lines, denoted by j=1 to j=149, having bytes of information stored in the lines. The 149 lines are 149 signal blocks (or sync blocks) that are stored sequentially in the video signal recording sector TP3. 90 bytes of information, denoted by i=1 to i=90, are stored in each signal block (line).

The first two bytes (i=1 and i=2) of each signal block, form a synchronization pattern 2 bytes long. The following three bytes in each signal block, form an ID code including information which indicates the sequence number of the signal block in the video signal recording part TP3. The last eight bytes in each of the signal blocks comprise horizontal parity information. Vertical parity information is stored in i=6 to i=82, inclusive, of the last 11 signal blocks.

Bytes of video signal information are stored in locations i=6 through i=82 of signal blocks j=3 through j=137. Bytes of auxiliary data are stored in i=6 through i=82 of signal blocks j=1, 2 and 138. The signal blocks are stored sequentially in the video signal part TP3, starting with the signal block denoted j=1, followed by the signal block denoted j=2, and so on until the signal block denoted j=149.

The auxiliary data for storage in the signal blocks j=1, 2 and 138, can be teletext data or control data.

It should be noted here that it can be specified that the auxiliary data will be stored into a different location in the memory. Reference is made, in this respect, to reference (1) above, FIGS. 13a-13c, where the auxiliary data is stored in the memory part denoted by III.

Figure 3:
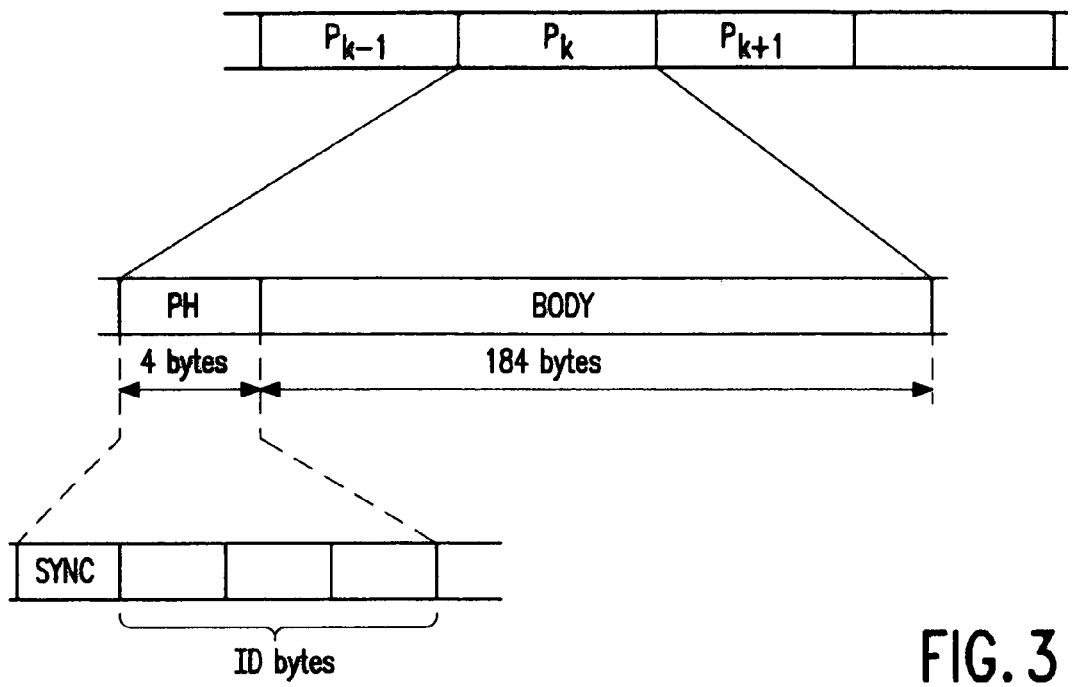
FIG. 3 schematically shows the serial MPEG datastream and the format of the transport packets included in the serial MPEG datastream.

FIG. 3 shows, schematically, the MPEG datastream applied to a recording arrangement in accordance with the invention. The MPEG datastream comprises multiple sequential transport packets, denoted by . . . , $P_{k-1}$, $P_k$, $P_{k+1}$, . . . The packets each comprise a packet header portion PH of 4 bytes long and a body portion of 184 bytes long. The transport packets can be transmitted in a datastream having a constant bit-rate. This means that the packets are equally long, viewed in time, and are received at a fixed packet rate. Alternatively, the packets may be transmitted in a datastream having a variable bit-rate. In this situation, the packets need not be of the same length, viewed in time, and may be received with a variable packet rate. The first byte in the packet header PH is a sync byte. The sync byte is identical for all the transport packets. The other three bytes in the header comprise ID information, such as a packet identifier. For a further explanation of the contents of the ID information, reference is made to reference (4) above, more specifically, Chapter V, Paragraph 5.1 on page 27.

The body portion of the transport packets each comprise 184 bytes for storing the video and audio information that should be transmitted in accordance with the MPEG format. The body portion of one transport packet can store either audio information corresponding to a certain video signal, or the video signal. Furthermore, when a number of video programs are transmitted via the MPEG datastream, the body portion stores a video or audio signal corresponding to one of such video programs transmitted.

The invention now aims at recording the video signal, and the corresponding audio signal corresponding to one of those video programs transmitted via the MPEG data stream, onto the record carrier having the track format disclosed in FIGS. 1 and 2. Information stored in the MPEG transport packets, should be stored in the recording signal blocks, more specifically, in the 135 signal blocks denoted j=3 through 137 in the video signal recording part TP3 of a track. The two sync bytes, denoted i=1 and 2, the ID information in the form of the three ID bytes denoted i=3, 4 and 5, as well as the 8 horizontal parity bytes, denoted by i=83 through 90, in those signal blocks, are required for a correct recording and reproduction. As a consequence, only the 77 bytes, denoted by i=6 through 82, in the signal blocks denoted by j=3 through 137, are available for storage of transport packets of MPEG information. The part of the signal blocks formed by the 77 bytes i=6 through 82, is defined as being the second block sections of the signal blocks.

Synchronization during recording and reproduction is assured by the sync words in each of the signal blocks, there is no need for recording the sync bytes of the transport packets. Hence, before storing the information of the transport packets into the second block sections of the signal blocks denoted by j=3 through 135, the sync byte of each of the transport packets is thrown away. As a result, only 187 bytes of information should be stored in the signal blocks for each transport packet.

Figure 4:
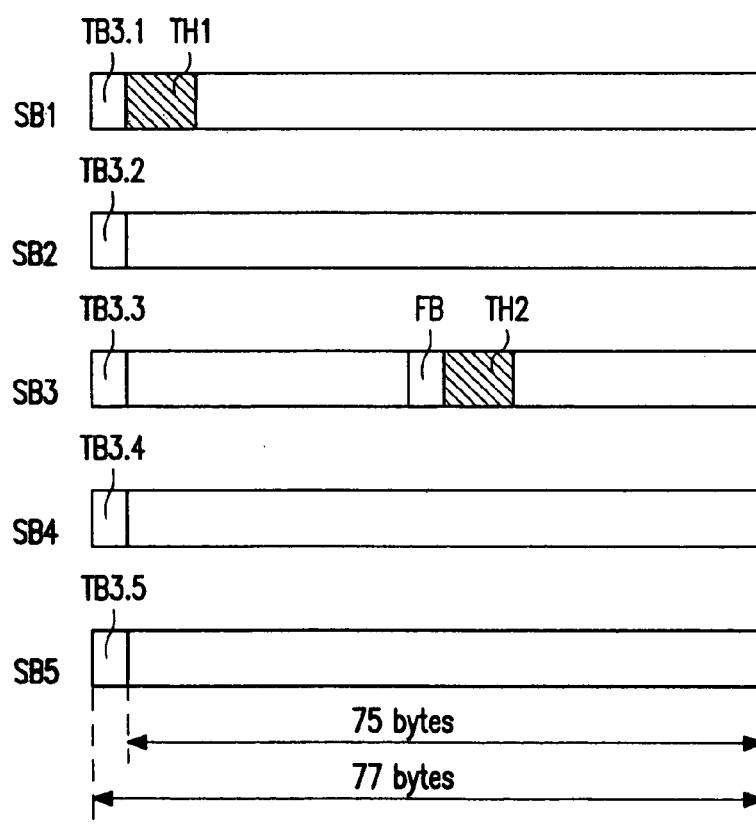
FIG. 4 shows an example of the storage of two transport packets in five signal blocks of the invention.

A simple calculation makes clear that two transport packets can be stored in five signal blocks, and that 11 bytes remain available for the storage of other information. FIG. 4 gives an example of how the two transport packets can be stored in the second block sections of the group of five signal blocks, denoted SB1-SB5 in FIG. 4. FIG. 4 only shows the contents of the second block sections of 77 bytes included in the signal blocks. As can be seen in FIG. 4, the 11 bytes are divided over the group of five signal blocks such that each second block section includes a third block section, TB3.1-TB3.5, of two bytes long at the beginning of the second block sections of the five signal blocks SB1-SB5, respectively, and a third block section of one byte, denoted by FB, is available in the third signal block SB3. The 187 bytes of the first transport packet are stored in the signal blocks SB1, SB2 and SB3, where the three ID bytes of the packet header of the first transport packet, indicated by TH1, are stored first in the signal block SB1, directly after the third block section TB3.1, and next, the first 72 first bytes in the body of the first transport packet are stored thereafter in the second block section of the signal block SB1. The next 75 bytes in the body of the first transport packet are stored in the second block section of the signal block SB2, after the third block section TB3.2, and the last 37 bytes in the body of the first transport packet are stored in the second block section of the signal block SB3, after the third block section TB3.3.

Next comes the byte FB, which indicates the boundary between the information of the first and second transport packets stored in the group of five signal blocks. The 187 bytes of the second transport packet are stored in the signal blocks SB3, SB4 and SB5, where the three ID bytes of the packet header of the second transport packet, indicated by TH2, are stored first in the signal block SB3, directly after the byte FB. Next, the first 34 first bytes in the body of the second transport packet are stored thereafter in the second block section of the signal block SB3. The next 75 bytes in the body of the second transport packet are stored in the second block section of the signal block SB4, after the third block section TB3.4, and the last 75 bytes in the body of the second transport packet are stored in the second block section of the signal block SB5, after the third block section TB3.5.

It should be noted that another spreading of the 11 available bytes over the five signal blocks is possible. As an example, the 11 bytes could have been split into two third block sections, one third block section having, for example, 6 bytes and being located at the beginning of the first signal block SB1, and the other third block section of 5 bytes long, being located in the third signal block, and indicating the boundary between the two transport packets stored in the five signal blocks. Another example could have been to have a third block section located at the beginning of the signal blocks SB1 and SB3, and another third block section, in the third signal block SB3, indicating the boundary between the two transport packets stored in the five signal blocks, where the third block section in the signal block SB1 can have, e.g., 4 bytes, the first third block section in the signal block SB3, e.g., 3 bytes, and the third block section in signal block SB3 indicating the boundary, being e.g., 4 bytes long.

The third block sections TB3.1 to TB3.5 can be used for the storage of additional information. As a first example, the third block section TB3.1 can include an indication identifying the signal block SB1 as being the first signal block in a group of five signal blocks. This can be realized by storing, in one specific bit location in the third block section TB3.1, a bit value of a certain polarity, such as '0' or '1'. In the same bit locations in the third block sections TB3.2-TB3.5, a bit value of the opposite polarity should be stored. In another example, sequence number information, e.g., sequence numbers running from 1-5, can be stored in the third block sections TB3.1-TB3.5, respectively, of the group of five signal blocks, where the third block section TB3.1 has the sequence number '1' and the third block section TB3.5 has the sequence number '5' stored in them. Three specific bit locations in the third block sections TB3.1-TB3.5 are required to store the sequence numbers. The sequence numbers can, however, also run across the group boundaries so as to identify a larger sequence of signal blocks, e.g., within one track, or even in more than one track.

In another example, one specific bit location in the third block sections TB3.1-TB3.5 of a group of five signal blocks, can be used to store either a bit value of one polarity, such as '0' or '1', so as to indicate that the video data included in the signal block is so-called 'normal play' data, or a bit value of the opposite polarity, so as to indicate that the video data included in the signal block is so-called 'trick play' video data. The use of the 'normal play' video data and 'trick play' video data will be explained later.

In again another example, sequence numbers are generated in response to transport packets in the MPEG datastream that is received. As has been explained earlier, such an MPEG datastream can include more than one video program. As the bit-rate of the MPEG datastream is normally higher than the bit-rate of the signal that can be recorded, only one video program may be selected from the serial MPEG datastream for recording. Selection of one video program, means selection of transport packets out of the datastream of the MPEG datastream that comprise the information relating to the one video program, and deleting (not recording) the other packets. Consequently, the serial array of transport packets that will be recorded have sequence numbers that are not necessarily the next higher numbers, because those sequence numbers of the deleted transport packets are not present. When storing the sequence numbers in the third block sections, those sequence numbers can be retrieved upon reproduction. By checking the subsequent sequence numbers retrieved, it can be established whether the original MPEG datastream applied to the recording arrangement, originally included deleted transport packets between two transport packets reproduced. If so, a replica of the original MPEG datastream can be regenerated by inserting one or more dummy packets between the two transport packets reproduced.

In a related example, timing information is stored in the third block sections, for the same reason as given above, namely, for regenerating a replica of the original MPEG datastream, in the case that such datastream is a datastream having a variable bit-rate.

It will be clear that a combination of the additional information described above can be included in the 11 bytes available for the storage of such information in a group of five signal blocks.

As an example, it has been made clear above that a 3-bit word is needed in the third block sections to indicate the sequence numbers of the signal blocks in the group of five signal blocks. More specifically, the 3-bit words '000', '001', '010', '011' and '100' could have been used to identify the sequence. This means that the 3-bit words '101', '110' and '111' remain available for a further identification. As an example, the 3-bit words '101' and '110' could be used to identify either 'normal play' data or 'trick mode' data.

Figure 5:
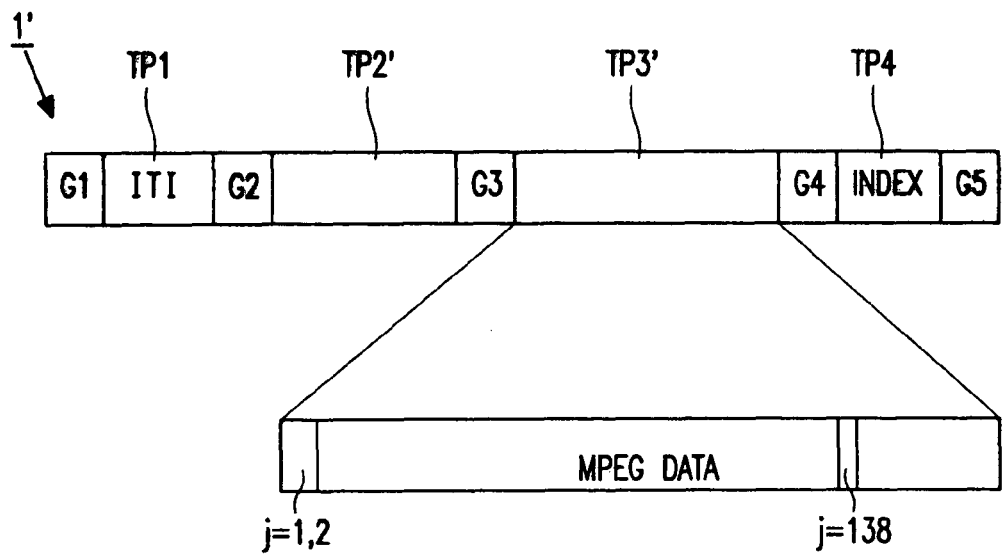
FIG. 5 shows the contents of the track with MPEG information recorded in it, according to the invention.

FIG. 5 shows the track format of the track if the MPEG information has been stored in the second block portions of the signal blocks of the track portion TP3 of FIG. 1, now denoted by track portion TP3'. FIG. 5 shows the first two signal blocks (j=1,2) in the track portion TP3' that still include the auxiliary data, followed by 135 signal blocks (j=3 through 137) now containing the MPEG information and the additional information described above. Next, one signal block (j=138) also containing the auxiliary data, is followed by 11 signal blocks comprising the parity information. The storage of the MPEG information and the additional information in the 135 signal blocks may require an additional error encoding step to be carried out on the information, resulting in additional parity information that should also be stored in a track. As the MPEG information, which includes video information and corresponding audio information, is stored in the signal 135 blocks in the track portion TP3', there is no need for storing audio information in the track portion TP2 of FIG. 1. This portion, now denoted by TP2' in FIG. 5, can be used to store the parity information resulting from the additional error encoding step.

Figure 6:
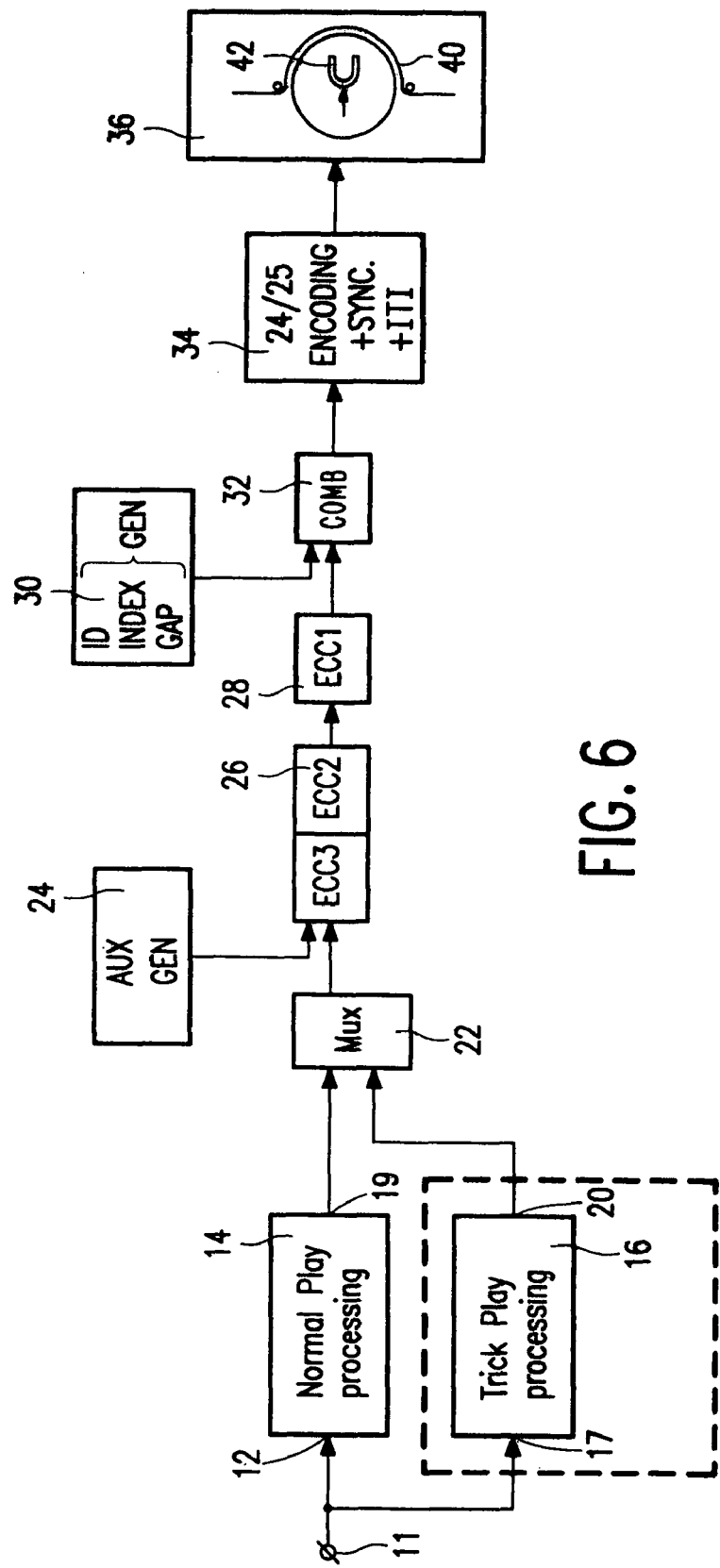
FIG. 6 illustrates an embodiment of the recording arrangement of the invention.

FIG. 6 shows, schematically, an embodiment of the recording arrangement. The recording arrangement includes an input terminal 11 for receiving the MPEG serial datastream for recording transport packets included in the datastream into the signal blocks of the track portions TP3' of the tracks. The input terminal 11 is coupled to an input 12 of a 'normal play' processing unit 14. Optionally, a 'trick play' processing unit 16 is provided having an input 17 also coupled to the input terminal 11. Outputs 19 and 20 of the 'normal play' processing unit 14 and the 'trick play' processing unit 16 (if present) are coupled to corresponding inputs of a multiplexer 22. It will be clear that in the absence of the 'trick play' processing unit 16, the multiplexer 22 will be absent.

An auxiliary signal generator 24 is present for supplying the auxiliary signal information for storage into the signal blocks denoted by j=1,2 and 138, see FIG. 2. Outputs of the multiplexer 22 and the generator 24 are coupled to corresponding inputs of an error correction encoder unit 26. The error correction encoder unit 26 is capable of carrying out a first error correction encoding step, denoted ECC3, and a second error correction encoding step, denoted ECC2. Next a third error correction encoding step, denoted ECC1, is carried out in an error correction encoder unit 28.

The recording arrangement further includes a generator 30 for adding the ID information into the bytes i=3, 4 and 5 of the signal blocks, see FIG. 2, for adding the index information for storage into the track portion TP4, see FIG. 5, and the gap information for realizing the gaps G1-G5, see FIG. 5. After combination of the signals in the combining unit 32, the combined signal is applied to an encoding unit 34, in which an encoding is carried out. Each time 24-bit words of the incoming bitstream are converted into 25-bit words, a sync word is added so as to obtain the first two bytes (i=1,2) in the signal blocks and the ITI information is added for storage in the track portion TP1.

The 24-to-25 encoding carried out in the encoding unit 34 is well known in the art. Reference is made in this respect to U.S. Pat. No. 5,142,421, reference (5) above. This reference also describes a way of adding the sync word to the datastream.

An output of the encoding unit 34 is coupled to an input of a writing unit 36 in which the datastream obtained with the encoding unit 34 is recorded onto the slant tracks on the record carrier by at least one write head 42.

The first error correction encoding step, denoted ECC3, is required so as to realize the additional error protection for the MPEG information to be recorded onto the record carrier, and results in parity information that will be stored in the track portion TP2', as has been explained previously. The second error correction encoding step, denoted ECC2, results in the vertical parity information that will be stored into the 11 signal blocks (j=139 through 149) of the track portion TP3', see FIGS. 2 and 5. The third error correction encoding step, denoted ECC1, results in the horizontal parity information that will be stored into the last 8 bytes of the signal blocks in the track portion TP3'; see FIGS. 2 and 5.

Before a further description of the 'normal play' processing unit 14 and the 'trick play' processing unit 16 of the recording arrangement of FIG. 6 will be given, a schematic description of the reproducing arrangement will be given. This has the advantage that when further describing certain measures applied in the processing units 14 and 16, a direct relation can be given to the advantages and consequences of those measures during reproduction.

Figure 7:
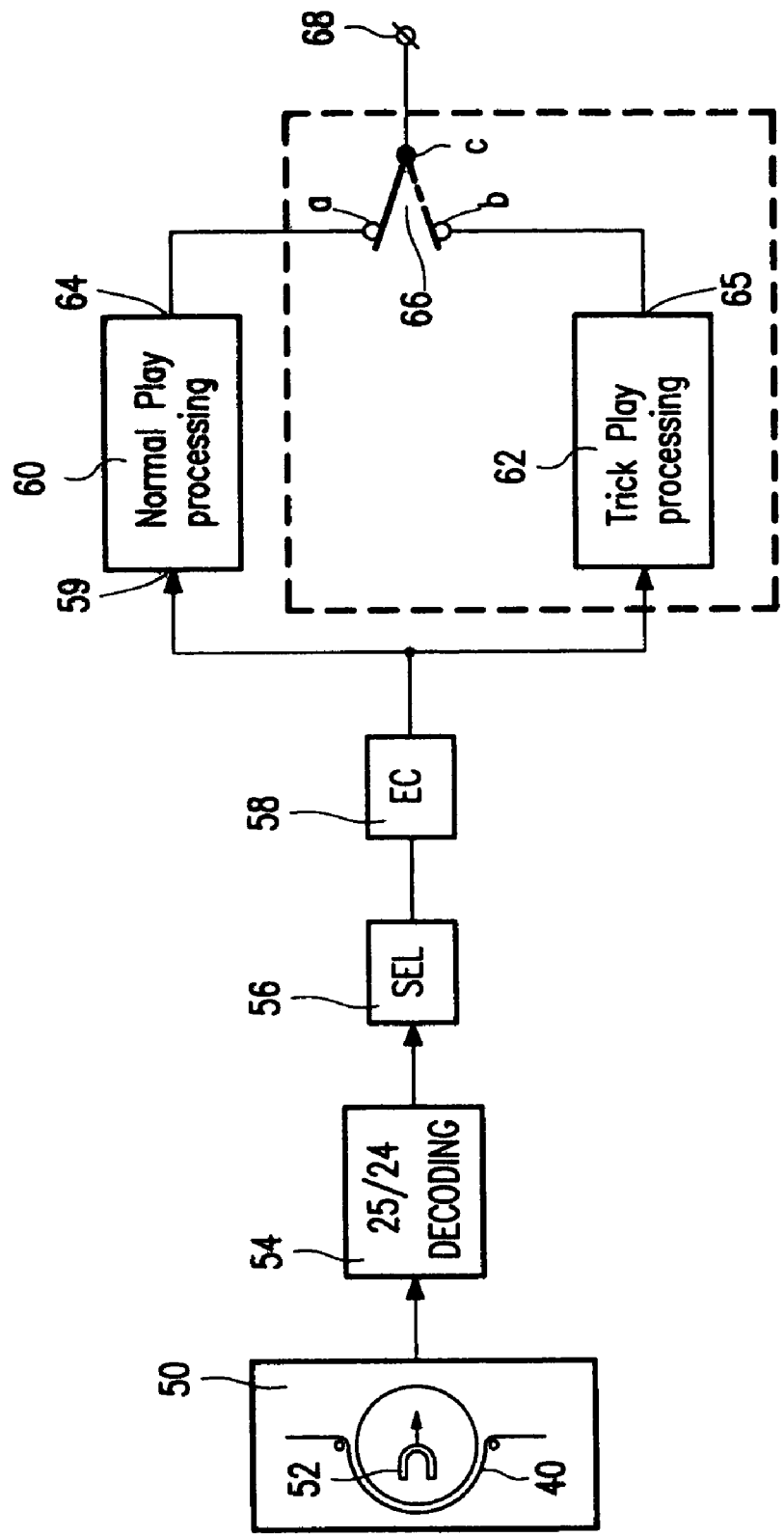
FIG. 7 shows an embodiment of the reproducing arrangement of the invention.

FIG. 7 shows, schematically, an embodiment of a reproduction arrangement for reproducing information from the record carrier 40, obtained with the recording arrangement of FIG. 6. The reproduction arrangement includes a reading unit 50 having at least one read head 52 for reading information from the slant tracks on the record carrier 40. An output of the reading unit 50 is coupled to an input of a decoding unit 54, which carries out a 25-to-24 decoding on the signal read out, so as to convert 25-bit words in the incoming datastream into 24-bit words. Next, after having selected out, in the selector unit 56, all the information that is not required for recreating a replica of the original MPEG datastream, an error correction is carried out in the error correction unit 58. It will be clear that the error correction carried out has three steps. One error correction step based on the ECC1, using the horizontal parities, see FIG. 2, a second error correction step based on ECC2, using the vertical parities, and a third error correction step based on ECC3, using the parity information stored in the track portion TP2', see FIG. 5.

The output terminal of the error correction unit 58, is coupled to an input of a 'normal play' processing unit 60. Optionally, a 'trick play' processing unit 62 is provided having an input also coupled to the output of the error correction unit 58. Outputs 64 and 65 of the 'normal play' processing unit 60 and the 'trick play' processing unit 62 (if present) are coupled to corresponding terminals a and b, respectively, of a switch 66, a c-terminal of which is coupled to an output terminal 68. It will be clear that in the absence of the 'trick play' processing unit 62, also the switch 66 will be absent. If the reproducing arrangement is switched into a 'normal play' reproduction mode, this means that the record carrier is transported at a nominal speed, that the 'normal play' processing unit 60 is enabled, and the switch 66 is switched into the position a-c. If the reproducing arrangement is switched into a 'trick play' reproduction mode, also called 'feature mode', this means that the record carrier is transported at a speed other than the nominal speed, that the 'trick play' processing unit 62 is enabled, and the switch 66 is switched into the position b-c.

Now, a further discussion will be given of the processing units 14 and 16 of FIG. 6, in combination with the processing units 60 and 62 of FIG. 7.

It is assumed, that the recording arrangement is capable of selecting at least one video program and its corresponding audio signal from the serial MPEG datastream that is applied to the input terminal 11, in response to a selection signal supplied to the arrangement by a user. As has been said earlier, only those transport packets in the serial MPEG stream that include information relating to a selected video program, should be selected for recording. FIG. 8a shows the serial MPEG datastream as a function of time comprising the transport packets denoted $P_k$. It should be noted that the transport packets of the MPEG datastream do not contain a packet number. The packet numbers k, given to the packets in FIG. 8a, are, therefore, the numbers that will be generated by the packet number generator 86 of FIG. 9, that will be discussed later.

Selecting, for recording, only those packets of the packets $P_k$ of FIG. 8a that include information relating to the selected video program, means, for example, that the packets $P_{k-4}$, $P_{k-1}$, $P_k$, $P_{k+2}$, $P_{k+4}$, $P_{k+8}$ will be selected, and that the intermediate packets will be thrown away. As a result, a datastream has been obtained in the recording arrangement, for recording on the record carrier, as shown in FIG. 8b, which shows the datastream as a function of time. No conclusion should be drawn from the timing in the time scales of FIGS. 8a and 8b, nor from the relative location between the time scales in FIGS. 8a and 8b. This for the reason that, as has been said previously, the bit-rate of the original MPEG datastream (FIG. 8a) is different from (higher than) the bit-rate with which the selected transport packets will be recorded on the record carrier.

Figure 9:
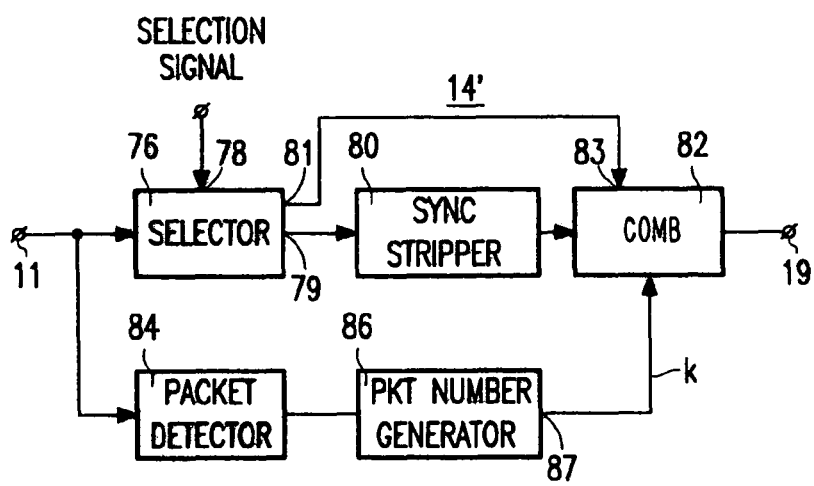
FIG. 9 illustrates an embodiment of the 'normal play' processing unit in the recording arrangement of FIG. 6, according to the invention.

An embodiment of the 'normal play' processing unit 14 for recording a datastream as shown in FIG. 8b, is shown, schematically, in FIG. 9. The embodiment denoted 14' in FIG. 9, includes a selector unit 76 having an input coupled to the input 11 of the unit 14'. The selector unit 76 has another input 78 for receiving the selection signal supplied by the user. An output 79 of the selector unit 76 is coupled to the input of a sync stripper 80, whose output is coupled to a signal combining unit 82. Also, an output 81 of the selector unit 76 is coupled to a control input 83 of the combining unit 82, for supplying a control signal to the combining unit 82.

The input 11 is further coupled to an input of a packet detector 84, which has an output coupled to an input of a packet number generator 86. An output of the packet number generator 86 is coupled to a second input of the combining unit 82.

The selector unit 76 selects the transport packets $P_{k-4}$, $P_{k-1}$, $P_k$, $P_{k+2}$, $P_{k+4}$, $P_{k+8}$ from the serial MPEG datastream applied to the input 11, in response to the selection signal received via the input 78. The packets selected are applied to the sync stripper 80, in which the first sync byte in the packet header PH, see FIG. 3, is deleted from the packets, in accordance with the description given previously. The packet detector 84 detects the receipt of each packet in the original serial MPEG data stream applied to the input 11 and generates a clock impulse for each packet detected. The packet number generator 86 includes a counter that counts up under the influence of the clock impulses applied to the packet number generator 86. As a consequence, a next higher count number is applied to the output for each clock impulse received. At the output 87 of the packet number generator 86, count numbers . . . k−4, k−3, k−2, k−1, k, k+1, k+2, k+3, k+8, . . . thus appear. Under the influence of the control signal applied to the control input 83 of the combining unit 82, the control unit combines the packets $P_{k-4}$, $P_{k-1}$, $P_k$, $P_{k+2}$, $P_{k+4}$, $P_{k+8}$, selected by the selector unit 76, as well as the count numbers k−4, k−1, k, k+2, k+4, k+8, out of the count number stream supplied by the packet number generator 86, for storage into the signal blocks.

Figure 10:
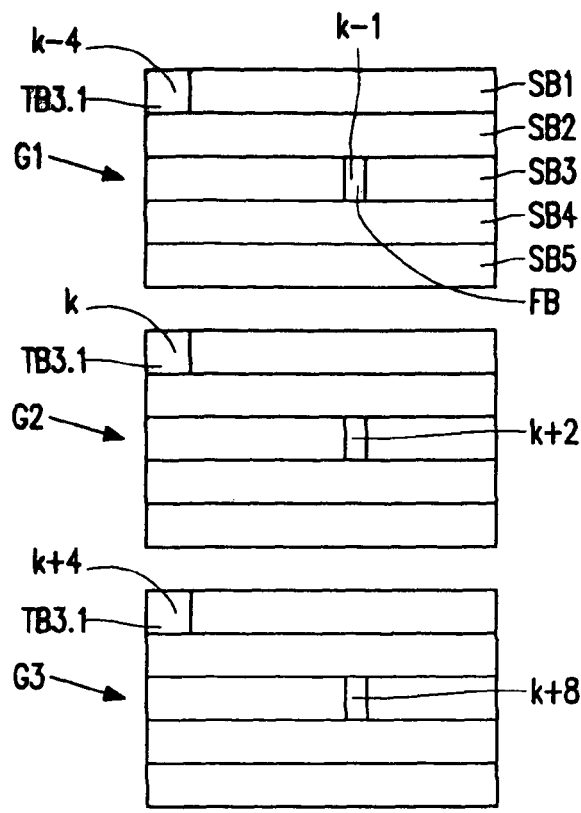
FIG. 10 shows an example of a sequence of three groups of five signal blocks each according to the invention.

FIG. 10 shows an example arrangement for the transport packets and the corresponding packet numbers stored in the groups of five signal blocks. FIG. 10 shows three subsequential groups of five signal blocks, denoted G1, G2 and G3, in which the information is stored. In the third block section TB3.1 of the first signal block SB1 of the group G1, the packet number k−4 is stored, and the information in the packet $P_{k-4}$ is stored thereafter in the signal blocks SB1, SB2 and SB3 of the group G1. In the third block section denoted FB of the third signal block SB3 of the group G1, the packet number k−1 is stored, and the information contained in the packet $P_{k-1}$ is stored thereafter in the signal blocks SB3, SB4 and SB5 of the group G1. In the third block section TB3.1 of the first signal block SB1 of the group G2, the packet number k is stored and the information in the packet $P_k$ is stored thereafter in the signal blocks SB1, SB2 and SB3 of the group G2. In the third block section denoted FB of the third signal block SB3 of the group G2, the packet number k+2 is stored, and the information in the packet $P_{k+2}$ is stored thereafter in the signal blocks SB3, SB4 and SB5 of the group G2. In the third block section TB3.1 of the first signal block SB1 of the group G3, the packet number k+4 is stored, and the information in the packet $P_{k+4}$ is stored thereafter in the signal blocks SB1, SB2 and SB3 of the group G3. In the third block section denoted FB of the third signal block SB3 of the group G3, the packet number k+8 is stored, and the information in the packet $P_{k+8}$ is stored thereafter in the signal blocks SB3, SB4 and SB5 of the group G3. As long as the number of bits of the packet number is smaller than or equal to 8, the packet number will fit in the third block section FB, which is 1 byte long.

Figure 11:
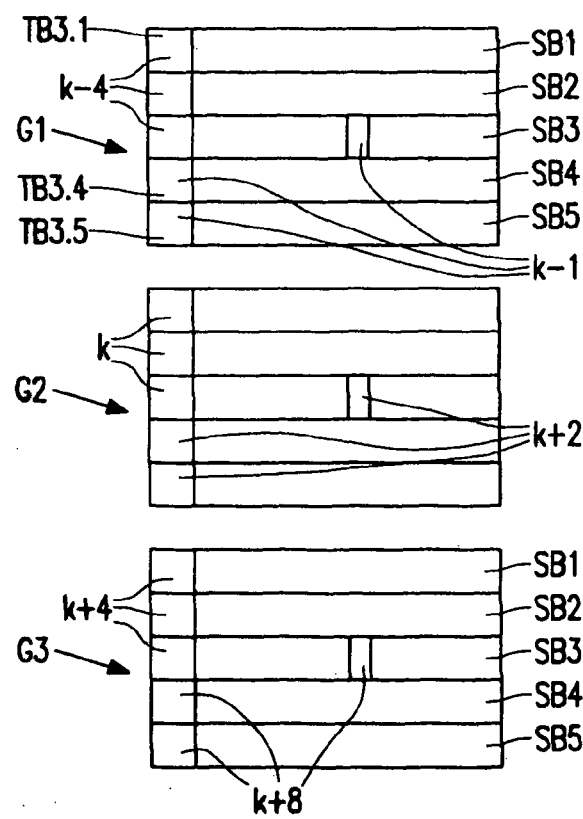
FIG. 11 illustrates another example of a sequence of three groups of five signal blocks each according to the invention.

Another example of storing the packet numbers in the third block sections is given in FIG. 11. In the third block sections TB3.1, TB3.2 and TB3.3 of the signal blocks SB1, SB2 and SB3, respectively, of the group G1, the packet number k−4 is stored, and the information in the packet $P_{k-4}$ is stored in the signal blocks SB1, SB2 and SB3 of the group G1, as explained previously with reference to FIG. 4. In the third block section denoted FB of the third signal block SB3 of the group G1, as well as in the third block sections TB3.4 and TB3.5 of the signal blocks SB4 and SB5, respectively, of the group G1, the packet number k−1 is stored, and the information in the packet Pk−1 is stored in the signal blocks SB3, SB4 and SB5 of the group G1, as explained previously with reference to FIG. 4. In the third block sections TB3.1, TB3.2 and TB3.3 of the signal blocks SB1, SB2 and SB3, respectively, of the group G2, the packet number k is stored, and the information in the packet $P_k$ is stored in the signal blocks SB1, SB2 and SB3 of the group G2. In the third block section denoted FB of the third signal block SB3 of the group G2, as well as in the third block sections TB3.4 and TB3.5 of the signal blocks SB4 and SB5, respectively, of the group G2, the packet number k+2 is stored, and the information in the packet $P_{k+2}$ is stored in the signal blocks SB3, SB4 and SB5 of the group G2. In the third block sections TB3.1, TB3.2 and TB3.3 of the signal blocks SB1, SB2 and SB3, respectively, of the group G3, the packet number k+4 is stored, and the information in the packet $P_{k+4}$ is stored in the signal blocks SB1, SB2 and SB3 of the group G3. In the third block section denoted FB of the third signal block SB3 of the group G3, as well as in the third block sections TB3.4 and TB3.5 of the signal blocks SB4 and SB5, respectively, of the group G3, the packet number k+8 is stored, and the information in the packet $P_{k+8}$ is stored in the signal blocks SB3, SB4 and SB5 of the group G3.

Instead of storing the packet number k−4 in the third block section TB3.3 of the signal block SB3 in group G1, one could have stored the packet number k−1 in the third block section. Instead of storing the packet number k in the third block section TB3.3 of the signal block SB3 in group G2, one could have stored the packet number k+2 in the third block section. Instead of storing the packet number k+4 in the third block section TB3.3 of the signal block SB3 in group G3, one could have stored the packet number k+8 in the third block section.

Figure 12:
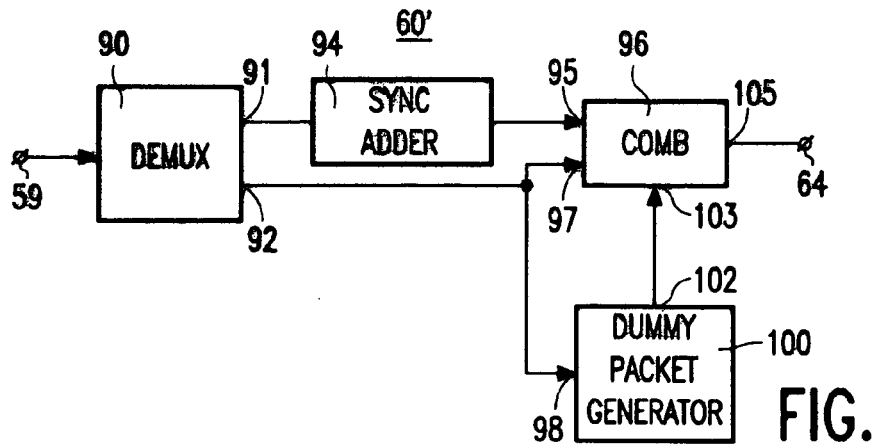
FIG. 12 shows an example of the 'normal play' processing unit in the reproducing arrangement of FIG. 7, according to the invention.

FIG. 12 schematically shows an embodiment of the 'normal play' processing unit 60 of the reproducing arrangement of FIG. 7, for regenerating a replica of the original MPEG datastream of FIG. 8a from the datastream as shown in FIG. 8b, using the packet number information also stored in the signal blocks, in the way described above. The regenerated replica of the MPEG datastream, is shown in FIG. 8c. The embodiment of the 'normal play' processing unit of FIG. 12, denoted by 60', includes a demultiplexer 90 having its input coupled to the input 59 of the processing unit 60', for receiving the subsequent groups of signal blocks, such as the groups G1, G2 and G3 of FIG. 10 or 11, and for retrieving therefrom the packets that are supplied to an output 91, and for retrieving the array of packet numbers . . . k−4, k−1, k, k+2, k+4, k+8 . . . from the third block sections in the signal blocks, and for supplying the array of packet numbers to an output 92. The packets retrieved are supplied to a sync adder circuit 94 in which the one byte long packet sync signal is reinserted as first byte in all the packets. The packets thus obtained are supplied to an input 95 of a combining unit 96. The output 92 of the demultiplexer 90, is coupled to inputs 97 and 98 of the combining unit 96 and a dummy packet generator 100, respectively. An output 102 of the dummy packet generator 100 is coupled to an input 103 of the combining unit 96. An output 105 of the combining unit 96 is coupled to the output 64 of the 'normal play' processing unit 60'.

Let us now assume that the packet Pk−4 and the packet number k−4 are retrieved from the first group G1 of five signal blocks, and are applied to the combining unit 96 and the dummy packet generator 100. This results in the packet $P_{k-4}$ being supplied to the output 105 by the combining unit 96.

Next, the packet $P_{k-1}$ and the packet number k−1 are retrieved from the group G1 and are applied to the combining unit 96 and the dummy packet generator 100. It is established, by means of a comparator and/or a subtractor (not shown), that the packet number k−1 is not the next higher packet number of the packet number k−4, received previously and that two packet numbers are missing. As a result, the dummy packet generator 100 generates, twice, a dummy packet of the same length as the other packets in the datastream, and the combining unit 96 inserts these two dummy packets into the serial datastream, directly after the packet $P_{k-4}$, see FIG. 8c. Next, the combining unit 96 inserts the packet $P_{k-1}$ into the serial datastream.

It should be noted here that there is no specific need for the generator 100 to be explicitly a dummy packet generator. It is also possible that the generator 100 is a dummy info generator that generates dummy information of a certain length in time, this length of time being equal to the length of time of a packet or equal to a multiple of the length of time of a packet.

The packet $P_k$ is the next packet that is retrieved by the demultiplexer 90, and this packet is supplied, after the addition of the sync byte, to the input 95 of the combining unit 96. The packet number k is supplied to the inputs 97 and 98 of the combining unit 96 and the dummy packet generator 100. As the packet number k is the next higher packet number to packet number k−1, no dummy packet is generated, and the packet $P_k$ is supplied to the output 105.

Next, the packet $P_{k+2}$ is retrieved. After comparison of the packet number k+2 with the previous packet number k retrieved, it appears that one dummy packet must be inserted in the serial datastream. The dummy packet is inserted. Next, the packet $P_{k+2}$ is added into the datastream, see FIG. 8c. This process is continued for the other packets so as to obtain the regenerated replica of the MPEG datastream of FIG. 8c. When comparing FIGS. 8a and 8c, it will be clear that FIG. 8c shows an MPEG serial datastream having the same bit-rate and packet rate as the MPEG datastream of FIG. 8a. This datastream can now be applied to a standard MPEG decoder which is capable of decoding the one video program selected by the recording arrangement during recording, from the MPEG datastream of FIG. 8c.

Figure 14:
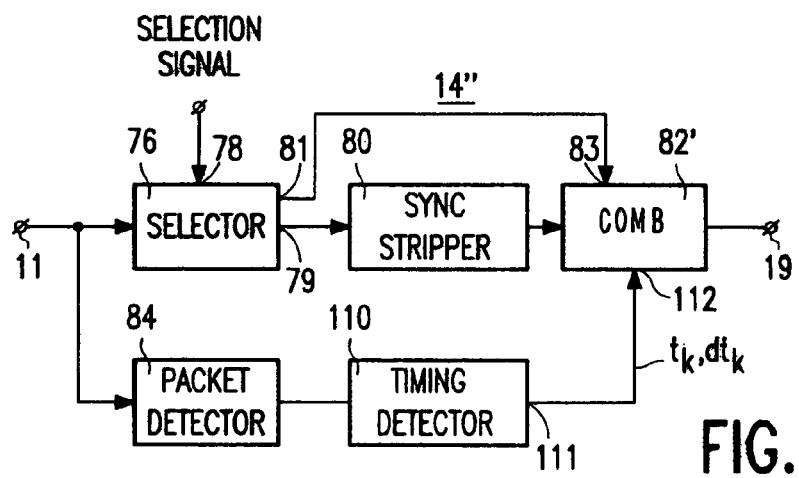
FIG. 14 depicts another embodiment of the 'normal play' processing unit in the recording arrangement of FIG. 6, according to the invention.
Figures 13A, 13B, 13C:
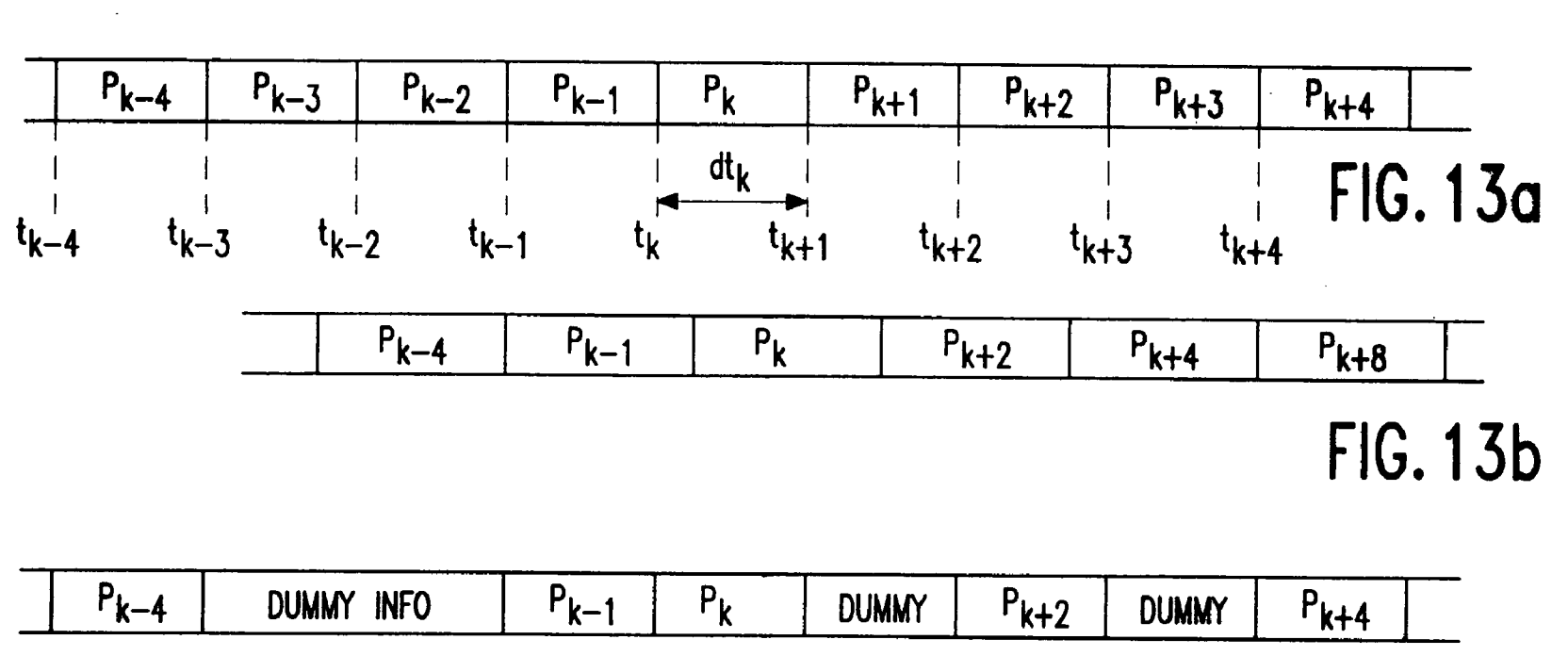

FIG. 13a shows an MPEG serial datastream as a function of time, the datastream comprising packets $P_k$ having a variable length, and the bit-rate in the datastream also being variable. It should be noted that the transport packets of the MPEG datastream do not include a packet number. The packet numbers k, given to the packets in FIG. 13a, are, therefore, only added in this description for identification purposes. FIG. 14 shows, schematically, an embodiment of the 'normal play' processing unit 14 for recording one video program that is included in the serial datastream as shown in FIG. 13a. The embodiment denoted 14" in FIG. 14 shows large resemblances with the embodiment of FIG. 9. The embodiment 14" differs from the embodiment of FIG. 9, in that, instead of the packet number generator 86, now a timing detector 110 is present, having its input coupled to the output of the detector 84, and having its output 111 coupled to the input 112 of the combining unit 82.

Selecting, for recording, only those packets of the packets $P_k$ in the serial datastream of FIG. 13a that include information relating to one video program that will be selected, means, for example, that the packets $P_{k-4}$, $P_{k-1}$, $P_k$, $P_{k+2}$, $P_{k+4}$, $P_{k+8}$ will be selected and that the intermediate packets will be thrown away. FIG. 13b shows the datastream of the selected packets that will be stored in the groups of signal blocks, as already explained with reference to FIGS. 10 and 11. It should be noted here, that there is no time relationship between the time axes in FIGS. 13a and 13b. Furthermore, it should be noted that, although the packets in the datastream of FIG. 13a have unequal length in time, they all include 188 bytes of information. Therefore, the packets selected and displayed in FIG. 13b have been shown as packets having an equal length in bytes.

The embodiment of FIG. 14, receives the datastream of FIG. 13a, and selects therefrom the packets $P_{k-4}$, $P_{k-1}$, $P_k$, $P_{k+2}$, $P_{k+4}$, $P_{k+8}$. The packet detector 84 detects the receipt of each packet in the original serial MPEG data stream applied to the input 11, and generates a clock impulse for each packet detected. In response to each clock impulse received, the timing detector 110 detects the time instants $t_k$, see FIG. 13a, of occurrence of the packets $P_k$. Thus, at the output 111 of the detector 110, appear the time instants . . . $t_{k-4}$, $t_{k-3}$, $t_{k-2}$, $t_{k-1}$, $t_k$, . . . , etc. Moreover, the time detector 110 detects the lengths of the time intervals $dt_k$ between two subsequent time instants, where $dt_k$ equals the time interval $t_{k+1}$-$t_k$. These time interval values $dt_k$ are also applied to the output 111. Under the influence of the combining signal applied to the control input 83 of the combining unit 82', the combining unit combines the packets $P_{k-4}$, $P_{k-1}$, $P_k$, $P_{k+2}$, $P_{k+4}$, $P_{k+8}$, selected by the selector unit 76, as well as the time instants and corresponding time intervals $t_{k-4}$, $dt_{k-4}$, $t_{k-1}$, $dt_{k-1}$, $t_k$, $dt_k$, $t_{k+2}$, $dt_{k+2}$, $t_{k+4}$, $dt_{k+4}$, $t_{k+8}$, $dt_{k+8}$, out of the information stream supplied by the timing detector 110 for storage into the signal blocks.

The storage of the transport packets in the signal blocks will be carried out in the same way as discussed above with reference to FIGS. 10 and 11. The storage of the timing information in the third block sections can be performed as follows but will not be shown.

In the third block section TB3.1 of the first signal block SB1 of the group G1 of FIG. 10, the timing information $t_{k-4}$ and $dt_{k-4}$ is stored. In the third block section, denoted FB, of the third signal block SB3 of the group G1, the timing information $t_{k-1}$ and $dt_{k-1}$ is stored. In the third block section TB3.1 of the first signal block SB1 of the group G2, the timing information $t_k$ and $dt_k$ is stored. In the third block section, denoted FB, of the third signal block SB3 of the group G2, the timing information $t_{k+2}$ and $dt_{k+2}$ is stored. In the third block section TB3.1 of the first signal block SB1 of the group G3, the timing information $t_{k+4}$ and $dt_{k+4}$ is stored. In the third block section, denoted FB, of the third signal block SB3 of the group G3, the timing information $t_{k+8}$ and $dt_{k+8}$ is stored.

It may be that the third block section TB3.1 in the first signal block SB1 in the groups, and/or the third block section FB in the third signal block SB3 in the groups, is/are too small for storing the timing information. In that case, the timing information can be stored somewhere else, or can be stored partly in the third block section TB3.1 and FB and partly somewhere else, see below.

In accordance with the example of FIG. 11, the timing information $t_{k-4}$ and $dt_{k-4}$ is stored in the third block sections TB3.1, TB3.2 and TB3.3 of the signal blocks SB1, SB2 and SB3, respectively, of the group G1. The storage of the timing information can be carried out once in the total storage capacity of the third block sections TB3.1, TB3.2 and TB3.3, or it can be repeated at least once. As an example, the timing information $t_{k-4}$ and $dt_{k-4}$ is stored in each of the third block sections TB3.1, TB3.2 and TB3.3. The timing information $t_{k-1}$ and $dt_{k-1}$ can be stored in the third block sections FB, TB3.4, and TB3.5 of the signal blocks SB3, SB4 and SB5, respectively, of the group G1. The storage of the timing information can be carried out once in the total storage capacity of the third block sections FB, TB3.4 and TB3.5, or it can be repeated at least once. As an example, the timing information $t_{k-4}$ and $dt_{k-4}$ is stored in each of the third block sections TB3.4 and TB3.5. It may be possible to store the timing information for the packet Pk−1 in the third block section TB3.3. It is further possible to store the timing information in the third block sections TB3.4 and TB3.5, and not in the block section FB.

The timing information for the packet $P_k$ can be stored in the third block sections of the group G2 in the same way as the timing information for the packet $P_{k-4}$ has been stored in the third block sections of the group G1. The timing information for the packet $P_{k+2}$ can be stored in the third block sections of the group G2 in the same way as the timing information for the packet $P_{k-1}$ has been stored in the third block sections of the group G1.

The timing information for the packet $P_{k+4}$ can be stored in the third block sections of the group G3 in the same way as the timing information for the packet $P_{k-4}$ has been stored in the third block sections of the group G1. The timing information for the packet $P_{k+8}$ can be stored in the third block sections of the group G3 in the same way as the timing information for the packet $P_{k-1}$ has been stored in the third block sections of the group G1.

Figure 15:
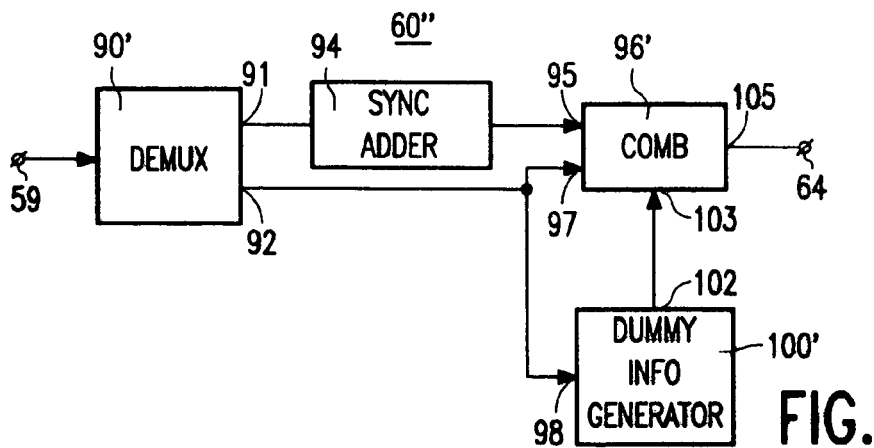
FIG. 15 illustrates another embodiment of the 'normal play' processing unit in the reproducing arrangement of FIG. 7, according to the invention.

FIG. 15 schematically shows an embodiment of the 'normal play' processing unit 60 of the reproducing arrangement of FIG. 7, denoted 60'', for regenerating a replica of the original MPEG datastream of FIG. 13a from the datastream as shown in FIG. 13b, using the timing information also stored in the signal blocks, in the way described above. The regenerated replica of the MPEG datastream is shown in FIG. 13c. The embodiment 60'' of FIG. 12 shows a large resemblance with the processing unit of FIG. 12. The demultiplexer 90' is again adapted to retrieve the packets from the subsequent groups of signal blocks, and to supply the packets to the output 91. The demultiplexer 90' is further adapted to retrieving the timing information $t_k$ and $dt_k$ from the third block sections in the signal blocks, and for supplying the timing information to the output 92. A sync byte is added to each packet in the sync adder 94. The packets thus obtained are supplied to the input 95 of the combining unit 96'. The output 92 of the demultiplexer 90 is coupled to inputs 97 and 98 of the combining unit 96' and a dummy info generator 100', respectively, for supplying the timing information to the combining unit 96' and the dummy info generator 100'.

Let us now assume that the packet $P_{k-4}$ and the corresponding timing information are retrieved from the first group G1 of five signal blocks, and are applied to the combining unit 96' and the dummy info generator 100'. This results in the packet $P_{k-4}$ being supplied to the output 105 by the combining unit 96' in response to the timing information. The length of the packet $P_{k-4}$ will be equal to $dt_{k-4}$, and the packet will be applied to the output 105 at a time instant corresponding to $t_{k-4}$. Next, the packet $P_{k-1}$ and the timing information corresponding to the packet $P_{k-1}$ are retrieved from the group G1 and are applied to the combining unit 96' and the dummy packet generator 100'. It is established, by means of a comparator and/or a subtractor (not shown), that the time instant $t_{k-1}$ is not equal to $t_{k-4}+dt_{k-4}$. Consequently, at least one packet following the packet $P_{k-4}$ has been thrown away during recording. As a result, the dummy info generator 100' generates a block of dummy information so as to fill the gap between the end of the packet $P_{k-4}$, at the time instant $t_{k-4}+dt_{k-4}$, and the time instant $t_{k-1}$, see FIG. 13c.

Next, the combining unit 96' inserts the packet $P_{k-1}$ having the length $dt_{k-1}$ into the serial datastream.

The packet $P_k$ is the next packet that is retrieved by the demultiplexer 90, and the packet is supplied, after the addition of the sync byte, to the input 95 of the combining unit 96'. The timing information corresponding to the packet $P_k$ is supplied to the inputs 97 and 98 of the combining unit 96 and the dummy info generator 100'. As $t_k$ equals $t_{k-1}+dt_{k-1}$, no dummy information needs to be generated, and the packet $P_k$ is supplied to the output 105.

Next, the packet $P_{k+2}$ is retrieved. After comparison of $t_{k+2}$ with $t_k+dt_k$, it is established that a gap is present that needs to be filled with dummy information generated by the dummy info generator 100'. The dummy information is supplied to output 105. Next, the packet $P_{k+2}$ having a length $dt_{k+2}$ is added into the datastream, see FIG. 13c. This process is continued for the other packets so as to obtain the regenerated replica of the MPEG datastream of FIG. 13c. When comparing FIGS. 13a and 13c, it will be clear that FIG. 13c shows an MPEG serial datastream having the same (variable) bit-rate and packet rate as the MPEG datastream of FIG. 13a. This datastream can now be applied to a standard MPEG decoder which is capable of decoding the one video program, selected by the recording arrangement during recording, from the MPEG datastream of FIG. 13c having the variable bit-rate and packet rate.

Now, other information will be described that can be inserted in the free space in the groups of signal blocks alone or together with the packet number information and/or the timing information described above.

One example of such other information is the information identifying a signal block in a group of y(=5) signal blocks to be the first signal block in the group of signal blocks. Such information can be stored in the third block sections TB3.1 of the signal blocks SB1 in the groups G1, G2 and G3, in FIGS. 10 and 11.

Another example of such other information, is the inclusion of a signal block number in the third block sections of the signal blocks, such as in the situation of FIG. 11. Signal block numbering can be carried out within a group, so that, in the example of FIG. 11, the numbers 1-5 are stored in the third block sections TB3.1-TB3.5, respectively, of the signal blocks SB1-SB5 in each group. Signal block numbering can also be realized for a larger number of signal blocks, belonging to more than one group of signal blocks. One could imagine that all the signal blocks in one track have a unique signal block number stored in the third block sections of the signal blocks. Now, all the signal blocks in a track can be identified by their unique signal block number.

Signal block numbering of the signal blocks as described above, has a number of advantages. Numbering the signal blocks opens the possibility to shuffle signal blocks in an order different from their original order, as long as the shuffling is done within a group of signal blocks identified by unique signal block numbers. By detecting the signal block numbers upon reproduction, a de-shuffling can be carried out on the shuffled signal blocks so as to obtain the original sequence order of the signal blocks.

Another measure that can be carried out is repeating a signal block, for the reason that the recording and subsequent reproduction of the information included in the signal block require a higher protection against transmission errors. Repeated signal blocks will have the same signal block numbers so that they are identifiable upon reproduction.

Further, upon detection of the signal block numbers, it can be determined whether a signal block has been lost because of transmission errors occurring during the subsequent recording and reproduction steps. When a signal block number in a sequence of signal block numbers is missing, it can be decided that the signal block having the signal block number that has been missed is lost. Upon such detection, an error correction or concealment can be carried out so as to correct or conceal the missing signal block.

Figure 16:
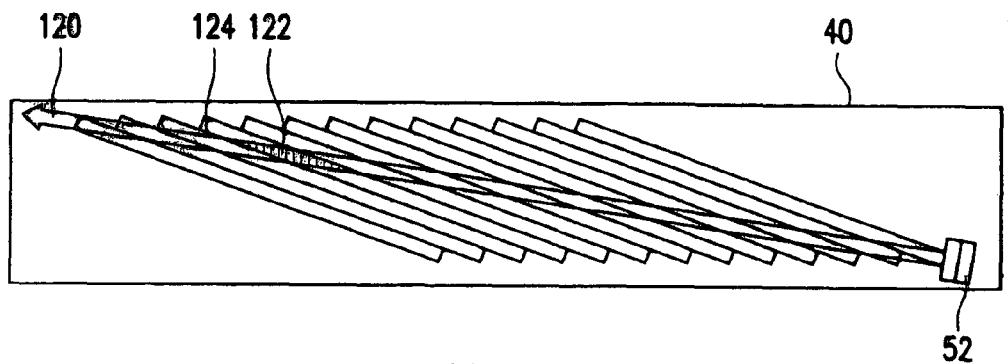
FIG. 16 shows the record carrier and the read head scanning the record carrier during a trick play mode, according to the invention.

Next, an explanation will be given of the functioning of the 'trick play' processing units 16 and 62 in the recording arrangement of FIG. 6 and the reproducing arrangement of FIG. 7, respectively. For carrying out a trick mode (or feature mode) reproduction with the reproduction arrangement, the record carrier 40 is transported with a speed other than the nominal transport speed. FIG. 16 shows the record carrier 40 having a number of slant tracks recorded on it. FIG. 16 also shows a path, denoted by the reference numeral 120, via which the reading head 52 scans the record carrier in the trick mode. Generally, the information in the tracks is recorded by at least two write heads having gaps of different azimuth angles, so that even numbered tracks have the one azimuth and odd numbered tracks have the other azimuth. This means that when scanning the record carrier along the path 120, the read head 52, which has one only of the two azimuth angles, will be able to read information from only the even-numbered or only the odd-numbered tracks.

In order to enable a reproduction of video information during a trick play mode, especially in the case of video information being recorded in a data reduced form, it is required to add special trick play information at special locations in the tracks, such that these locations are scanned by the read head 52 at the various transport speeds of the record carrier that are possible in a trick play mode. This trick play information is special video information recorded in addition to the normal play video information that has been recorded in the tracks in the way described above. As a consequence, some of the signal blocks in a track contain this trick play information, which should be scanned and read by the read head 52 in the trick play mode.

It should be noted here that the MPEG data, as far as the video data in the MPEG datastream is concerned, comprises data-reduced video information. To produce such data-reduced video information, the information corresponding to one picture is intra-encoded so as to obtain so-called I-frames. A higher data reduction can be obtained by carrying out an interframe encoding on at least the next two subsequent pictures, resulting in an I-frame for the first picture and a P-frame for the second picture. For recreating the two pictures, an intraframe decoding, inverse to the intraframe encoding, must be carried out on the I-frame information, so as to regenerate the first picture, and an interframe decoding, inverse to the interframe encoding, must be carried out using both the I-frame information and the P-frame information, so as to regenerate the second picture.

In a trick mode, only I-frame information can be used to regenerate a video signal, because retrieving both the I-frame information and also the corresponding P-frame information so as to realize an interframe decoding, is not possible. Therefore, in order to obtain the 'trick play' information, only the information stored in I-frames included in the serial MPEG datastream is extracted and used as 'trick play' data.

Figure 17:
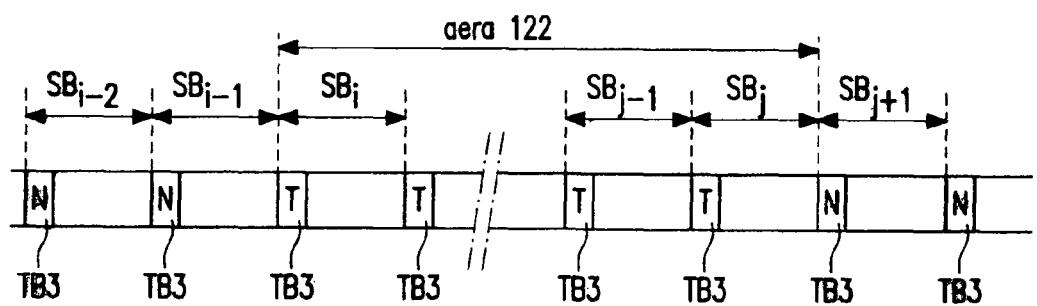
FIG. 17 illustrates the sequence of signal blocks in a track forming the trick play area in the invention.

In a special location in a track, such as in the location indicated by the hatched area 122 in the track 124 in FIG. 16, a number of signal blocks are inserted that comprise the 'trick play' information. FIG. 17 shows the sequence of signal blocks in the track 124. The hatched area 122 in FIG. 16 is formed by the sequence of signal blocks SB1-SBj in the sequence given in FIG. 17. The third block sections TB in the signal blocks contained in the trick play area 122 of the track now include an indication that the signal blocks comprise trick mode information. This indication information is denoted by 'T' in the third block sections TB3 of the signal blocks SB1-SBj. The signal blocks stored in the track prior to the trick play area 122, as well as the signal blocks stored in the track after the trick play area 122, include information indicating that the information stored in the signal blocks is normal play information. This indication information is denoted by 'N' in the third block sections TB3 in the signal blocks $SB_{i-2}$, $SB_{i-1}$, $SB_{j+1}$.

The 'trick play' processing unit 16 of FIG. 6 is thus capable of deriving the trick play information from the MPEG datastream applied to its input 17, storing the trick play information in those signal blocks that are specifically meant for storing the trick play information in a specific location in a track, and inserting the indication information indicating that the signal block is a signal block in which trick mode information is stored in the third block sections of those signal blocks. The 'normal play' processing unit 14 is further capable of storing the indication information indicating that the signal blocks generated by the unit 14 contain normal play information, in the third block sections of those signal blocks.

When the reproducing arrangement is switched into its trick mode, the trick play' processing unit 62 is capable of detecting those signal blocks that have the 'T' identification stored in their third block sections and to retrieve the information from those signal blocks for further processing so as to realize a reviewing option during the trick mode.

The invention has been disclosed with reference to specific preferred embodiments which enable those skilled in the art to make and use the invention, and which describe the best mode for carrying out the invention. Those skilled in the art may modify or add to these embodiments or provide other embodiments without departing from the spirit of the invention. Thus, the scope of the invention is only limited by the appended claims.

LIST OF REFERENCES (1) European Patent Application No. 492, 704, corresponding to U.S. Pat. No. 5,245,483 (PHN 13.546)
(2) European Patent Application No. 93.202.950, corresponding to U.S. Pat. No. 5,424,878 (PHN 14.241)
(3) European Patent Application No. 93.201.263, corresponding to U.S. Pat. No. 5,400,187 (PHN 14.449)
(4) Grand Alliance HDTV System Specification, Draft document, Feb. 22, 1994
(5) U.S. Pat. No. 5,142,421 (PHN 13.537)

The invention claimed is:

1. A recording arrangement for recording an information signal in tracks on a record carrier, the recording arrangement comprising: an input terminal for receiving the information signal; channel encoding means for channel encoding the information signal into a channel signal, the channel signal including subsequent signal blocks having a predetermined fixed length, each signal block comprising a first block section having a synchronization signal, and a second block section having a number of channel bytes; and writing means for writing the channel signal in the tracks on the record carrier, wherein the information signal is in a form of an MPEG information signal in accordance with an MPEG format, the MPEG information signal comprising subsequent transport packages having a predetermined fixed length, and wherein: the channel encoding means stores information included in x transport packets of the MPEG information signal in the second block sections of a first group of y first signal blocks of said signal blocks of the channel signal so as to enable a normal play mode using video information stored in said first group of y first signal blocks during a normal play reproduction mode; and the channel encoding means further receives a trick mode video signal and stores said trick mode video signal in second block sections of a second group of z second signal blocks of said signal blocks of the channel signal so as to enable a trick play mode using the video information stored in said second signal blocks, wherein the second block sections of at least one signal block in each first and second group of first and second signal blocks, respectively, comprise a third block section for storing identification information indicating whether the group comprises the first signal blocks or second signal blocks, and wherein x, y and z are integer constants in which x.gtoreq.1, y>1 and z>1.

2. The recording arrangement as claimed in claim 1, wherein the second block sections of the signal blocks comprise a third block section for storing sequence number information relating to a sequence number of the signal block.

3. The recording arrangement as claimed in claim 1, wherein the second block sections of all signal blocks in each first and second group of first and second signal blocks respectively comprise a third block section for storing identification information indicating whether the group comprises first signal blocks or second signal blocks.

4. The recording arrangement as claimed in claim 3, wherein the second block sections of a group of y signal blocks each comprise a third block section for storing sequence number information relating to a transport packet sequence number corresponding to the transport packet of which information is stored in said signal block.

5. The recording arrangement as claimed in claim 1, wherein the recording arrangement further comprises: detection means for detecting the moment of receipt of the transport packets, and for generating timing information for each transport packet received, and wherein the second block sections of at least those signal blocks in a group of y signal blocks that comprise the start portion of a transport packet comprise a third block section for storing the timing information for said transport packet having its start portion stored in the second block section of the signal block.

6. The recording arrangement as claimed in claim 5, wherein the second block sections of a group of y signal blocks each comprise a third block section for storing the timing information corresponding to the transport packet which has information stored in the second block section of said signal block.

7. The recording arrangement as claimed in claim 1, wherein y>x.

8. A non-transitory computer-readable storage medium comprising a record carrier having an information signal recorded on it in tracks on said record carrier, the signal recorded in the tracks being in a form of a channel encoded information signal, the channel encoded information signal comprising subsequent signal blocks having a predetermined fixed length, each signal block comprising a first block section having a synchronization signal, and a second block section having a number of channel bytes, wherein the information signal is an MPEG information signal in accordance with an MPEG format, the MPEG information signal comprising subsequent transport packets having a predetermined fixed length, information included in x transport packets of the MPEG information signal being included in the second block sections of a first group of y first signal blocks of the channel encoded information signal, so as to enable a normal play mode using video information stored in said first group of y first signal blocks during a normal play reproduction mode, wherein the information signal comprises a second group of z second signal blocks in which a trick mode video signal is stored so as to enable a trick play mode using video information stored in said second group of z second signal blocks, and wherein indication information, indicating whether a group comprises first signal blocks or second signal blocks, is stored in the third block sections of at least one signal block of the first and second groups and wherein x, y and z are integer constants in which x.gtoreq.1, y>1 and z>1.

9. The non-transitory computer-readable storage medium as claimed in claim 8, wherein sequence number information relating to the sequence number of the signal blocks is stored in the third block sections of the signal blocks.

10. The non-transitory computer-readable storage medium as claimed in claim 8, wherein the third block section of the second block sections of at least those signal blocks in a group of y first signal blocks that comprises the start portion of a transport packet, comprise information relating to a transport packet sequence number corresponding to the transport packet having its start portion stored in the second block section of the signal block.

11. The non-transitory computer-readable storage medium as claimed in claim 8, wherein the third block section of the second block sections of at least those signal blocks in a group of y first signal blocks that comprises the start portion of a transport packet, comprise timing information for said transport packet having its start portion stored in the second block section of the signal block.

12. A reproducing arrangement for reproducing an information signal that has been recorded in the form of a channel signal in tracks on a record carrier, the reproducing arrangement comprising: reading means for reading the channel signal from a track on the record carrier, the channel signal comprising subsequent signal blocks having a predetermined fixed length, each signal block comprising a first block section having a synchronization signal and a second block section having a number of channel bytes; channel decoding means for channel decoding the channel signal into the information signal; and an output terminal for applying the information signal, wherein the reproducing arrangement is adapted to reproduce an MPEG information signal in accordance with an MPEG format from the record carrier, the MPEG information signal comprising subsequent transport packets having a predetermined fixed length, wherein information contained in x transport packets of the MPEG information signal is stored in the second block sections of a first group of y first signal blocks of the channel signal enabling a normal play mode using video information stored in said first group of y first signal blocks during a normal play reproduction mode, a trick mode video signal being stored in a second group of z second block sections of second signal blocks of said signal blocks of the channel signal enabling a trick play mode using video information stored in said second group of second signal blocks where x, y and z are integer constants in which x.gtoreq.1, y>1 and z>1, wherein the second block sections of at least one first and second signal block in the first and second group each comprise a third block section for storing indication information indicating whether the group comprises first signal blocks or second signal blocks, and wherein the reproducing arrangement further comprises: first retrieving means for retrieving, in said normal play mode, the video information of the x transport packets of the MPEG information signal from the first group of y first signal blocks, and for retrieving, in said trick play mode, the trick mode video signal from the second group of z second signal blocks, in response to a first or a second control signal, and second retrieving means for retrieving the indication information indicating whether the group comprises first signal blocks or second signal blocks from the third block sections of the at least one signal block in the first and second groups, respectively, the second retrieving means generating said first and second control signals in response thereto.

13. The reproducing arrangement as claimed in claim 12, wherein the second block sections of the signal blocks comprise a third block section for storing sequence number information relating to the sequence number of the signal block, and wherein the second retrieving means retrieves the sequence number information from the third block sections of the signal blocks in said tracks.

14. The reproducing arrangement as claimed in claim 12, wherein the second block sections of at least those signal blocks in a group of y signal blocks that comprises the start portion of a transport packet, comprise a third block section for storing sequence number information relating to a transport packet sequence number corresponding to the transport packet having its start portion stored in the second block section of the signal block, and wherein the second retrieving means retrieves the sequence number information relating to the transport packet sequence number from a third block section of a signal block in the group of y signal blocks.

15. The reproducing arrangement as claimed in claim 12, wherein the second block sections of at least those signal blocks in a group of y signal blocks that comprises the start portion of a transport packet, comprise a third block section for storing timing information for said transport packet having its start portion stored in the second block section of the signal block, and wherein the second retrieving means retrieves the timing information from a third block section of a signal block in the group of y signal blocks.

16. The reproducing arrangement as claimed in claim 12, wherein y>x.

17. A method for recording an information signal in tracks on a recording carrier, said method comprising the steps: receiving the information signal; channel encoding the information signal into a channel signal, the channel signal comprising subsequent signal blocks having a predetermined fixed length, each signal block comprising a first block section having a synchronization signal and a second block section having a number of channel bytes; and writing the channel signal in the tracks on the record carrier, wherein the information signal is in the form of an MPEG information signal in accordance with an MPEG format on the record carrier, the MPEG information signal comprising subsequent transport packets having a predetermined fixed length, and wherein the channel encoding step comprises the sub-steps: storing information included in x transport packets of the MPEG information signal in the second block sections of a first group of y first signal blocks of said signal blocks of the channel signal so as to enable a normal play mode using video information stored in said first group of y first signal blocks during a normal play reproduction mode; receiving a trick mode video signal; storing said trick mode video signal in second block sections of a second group of z second signal blocks of said signal locks of the channel signal so as to enable a trick play mode using the video information stored in said second signal blocks; and storing identification information in the second block sections of at least one signal block in each first and second group of first and second signal blocks, respectively, indicating whether the group comprises the first signal blocks or second signal blocks, where x, y and z are integer constants in which x.gtoreq.1, y>1 and z>1.

* * * * *